United States Patent [19]

Sylla

[11] Patent Number: 5,113,597
[45] Date of Patent: May 19, 1992

[54] PROCESS FOR DRYING OF PLANT OR ANIMAL MATERIAL

[75] Inventor: Klaus F. Sylla, Bremen, Fed. Rep. of Germany

[73] Assignee: Kohlensaeurewerk Deutschland GmbH, Bad Hoenningen, Fed. Rep. of Germany

[21] Appl. No.: 556,854

[22] Filed: Jul. 24, 1990

Related U.S. Application Data

[63] Continuation of Ser. No. 328,590, filed as PCT/EP87/00349, Jun. 27, 1987, abandoned.

[30] Foreign Application Priority Data

Jul. 8, 1986 [DE] Fed. Rep. of Germany ....... 3622847
Feb. 16, 1987 [DE] Fed. Rep. of Germany ....... 3704773

[51] Int. Cl.⁵ ............................................... F26B 3/00
[52] U.S. Cl. ............................................. 34/22; 34/36
[58] Field of Search .................. 34/36, 37, 218, 22, 34/51, 17, 18; 426/489, 319, 312, 314, 263

[56] References Cited

U.S. PATENT DOCUMENTS

| | | | |
|---|---|---|---|
| 2,510,372 | 6/1950 | Bloxham | 34/36 X |
| 2,952,541 | 9/1960 | Fayhee | 34/36 X |
| 3,511,671 | 5/1970 | Miles | |
| 3,532,506 | 10/1970 | Rey et al. | |
| 4,251,923 | 2/1981 | Kuri | |

FOREIGN PATENT DOCUMENTS

| | | |
|---|---|---|
| WO86/01686 | 3/1986 | Australia |
| 253701 | 1/1949 | Switzerland |
| 525621 | 9/1972 | Switzerland |
| 563792 | 7/1975 | Switzerland |
| 1106468 | 3/1968 | United Kingdom |
| 1366331 | 9/1974 | United Kingdom |

*Primary Examiner*—Henry A. Bennet
*Attorney, Agent, or Firm*—Foley & Lardner

[57] ABSTRACT

Process for separating volatile substances from solid or liquid materials, in which the material which has to release the volatile substance is placed in contact, operating pressures of greater than 1 to 30 bars, with a dry or humid gas stream which may be introduced in the circuit.

13 Claims, 1 Drawing Sheet

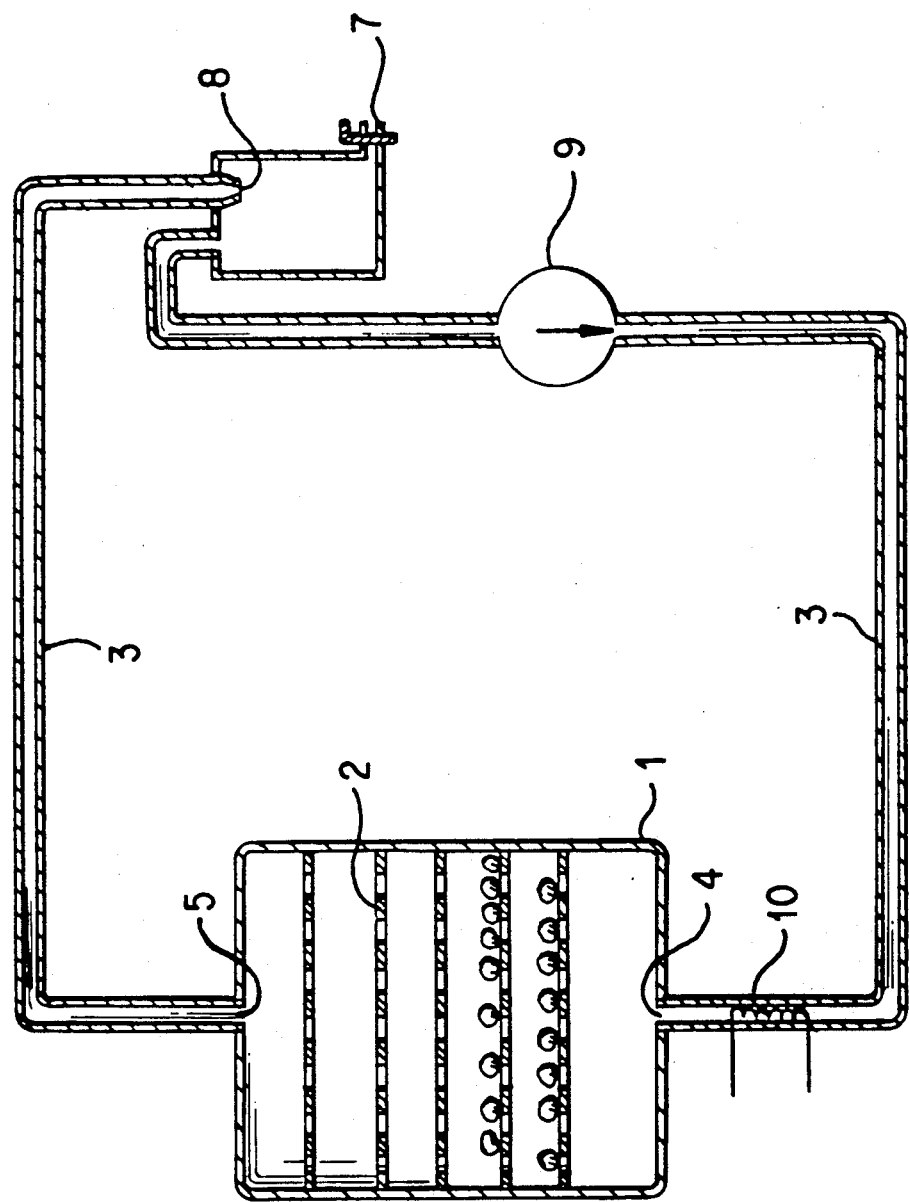

PROCESS FOR DRYING OF PLANT OR ANIMAL MATERIAL

This application is a continuation of application Ser. No. 328,590, filed as PCT/EP87/00349, Jun. 27, 1987, now abandoned.

The invention relates to a process for drying of plant or animal materials by contacting the material with a gas stream, which preferably is conducted in a circuit and which carries away the water to be separated.

Methods for the preserving of animal and plant materials by removal of moisture are known. A classical representative of the aforementioned process is hot air drying.

Many sensitive plant and animal materials are, however, sensitively damaged, thermally and oxidatively attacked and denatured in the conventional drying methods. In the usual drying processes, a series of undesired side reactions under the influence of high temperatures, oxygen and water vapor are unavoidable. Thus, a "cooked taste" arises in many foodstuffs, there is damage to the cell structure, enzymatic and oxidative decomposition reactions, aromas are decomposed or react with other materials, esters are hydrolyzed.

Many materials such as fresh fruit, fresh vegetables, or also the meat from shellfish, can not therefore at the present time be dried either by hot air drying or by freeze drying in a vacuum without deteriorating in quality.

Up to the most recent times there has been no lack of attempts to produce a remedy for this situation.

Thus, U.S. Pat. No. 4,251,923 discloses a process in which foodstuffs such as, for example, vegetables, fruit, grain or meat are subjected to a combination of vacuum drying and drying with a dry gas stream. The gas stream conducted in a circuit, for example nitrogen or carbon dioxide, is conducted across an adsorption layer which binds the water content and simultaneously captures aroma materials escaping from the material; these can then be released as a liquid and returned again.

The temperature of the gas stream should be maintained thereby between 10° C. and 5° C. The pressure normally lies at atomspheric pressure. The gas can, however, also be used at reduced or elevated pressure. Decisive for the success of the method described there, however, is the combination of vacuum drying with drying with a gas stream, whereby these two measures may be applied in alternation or simultaneously, and during the vacuum drying phase care must be taken that the material does not freeze.

PCT application WO 86/01686 discloses a suggestion to dry plant products by drying them to a reduced water content in a conventional manner with warm air and subsequently maintaining them in a substantially oxygen-free atmosphere. Since in sensitive materials the loss of quality already arises during drying with warmed air, this process can not be used for oxygen sensitive materials.

U.S. Pat. No. 3,511,671 discloses a process for removing water from foodstuffs which combines vacuum drying or hot air drying with a treatment of the material with nitrous oxide. The nitrous oxide is utilized at a pressure between about 1.5 and 2.4 bar and can be used in admixture with nitrogen or other inert gases. In any event, the treatment time is lengthened in case a mixture of nitrous oxide with other gases is used. The success of the process is attributed to a particular action of the nitrous oxide of entering into association with the foodstuff.

It is the object of the invention to now specify a process for separating water from animal and plant materials of the aforementioned type which permits a simple and economical drying of sensitive materials without deterioration in quality.

The solution of this object is achived in accordance with the invention in that carbon dioxide or a carbon dioxide-nitrogen mixture at a temperature between 30° and 80° C. and a pressure greater (than) 1 up to 30 bar is utilized as the gas.

The carbon dioxide or carbon dioxide-nitrogen mixture which is used, suppresses or decreases chemical, enzymatic or other undesired reactions in the material during the treatment. In the case of a carbon dioxide-nitrogen mixture, the proportion of nitrogen is not greater than 80%, preferably not greater than 50% and particularly preferably about 20%. Preferably carbon dioxide is utilized.

The desired process temperature is obtained by heating the gas or by radiant heat or convection heat. The gas pressure in the generally closed system is regulated by the pressure of the supplied gas or gas mixture.

The treatement temperature for less sensitive materials lies in the range from 30° to 80° C.; for the most sensitive materials, however, the temperature should lie between 30° and 50° C. Here, depending on the field of application of the process, a compromise between sparing the material and speed of the drying operation must be selected. It can be desirable to vary the process temperature during the separation of the water. It can be advantageous thereby to operate at a higher temperature at the outset in order to rapidly separate as much water as possible and thereafter to remove the residual moisture as gently as possible.

The process pressure is advantageously selected in the upper range, since at higher pressures the gas stream has a higher mass of all components, including the proportion of water vapor, and heat transport and material transport are thereby amplified. Because of the higher cost of pressure tight apparatus, operation at moderate pressures is advisable. Process pressures up to 16 bar, particularly 2 to 10 bar, most especially 2 to 6 bar, are preferred.

The period of time sufficient for substantial separation of the water extends from 1 to 48 hours, particularly from 4 to 24 hours.

For cost reasons, the gas stream should be conducted in a circuit and the water which is taken up therein separated at a suitable place in the circuit. Cooling and/or decompression are suitable for this, the latter primarily when operating at higher pressures since the gas is thereby cooled at a simple nozzle and can be separated from condensed water. It is warmed again by subsequent compression.

Adsorbers are also suitable for taking up water from the gas circuit.

When conducting the gas stream in a circuit it can be advantageous to subject only a portion of the (moisture)-laden gas to the separation treatment. The speed at the product is thereby increased and a better charging of the gas with water obtained.

In particular, fruit, vegetables, mushrooms, berries, tubers, cereals, nuts, grapes, herbs and other plants and their fruits, or also meat and other cell materials from mammals, fish, shellfish and mollusks, microorganisms and other cell materials can be utilized as materials.

With these sensitive materials it has been found, surprisingly, that that no decrease in quality arises. Even at elevated temperature, at about 50° C., oxidative and also enzymatic decompositon reactions are practically completely suppressed. Also, despite the rapidly progressing drying at these temperatures, amazingly, practically no loss of quality arises through cell destruction. The dried materials are outstandingly capable of storage and subsequent rehydration again without loss of aroma and deterioration of natural flavor. A hardening of the outer layers is not observed.

In the following the process according to the invention will be explained in further detail on the basis of the description of the manner of operation of an apparatus suitable for carrying it out. Reference will thereby be made to the accompanying drawing which schematically illustrates this device.

The apparatus comprises a conditioning vessel 1 in which perforated metal sheets 2 are arranged one after another in the direction of flow of the gas stream. In the illustrated working embodiment, the dry protective gas flows in at the bottom of the conditioning vessel 1 and exits this charged with water vapor at its top; the perforated metal sheets each lie horizontally, transversely of the direction of flow of the protective gas and follow vertically one after another in the direction of flow.

On the perforated metal sheets 2, as illustrated schematically in the drawing, is the material to be dried, so that the protective gas stream passing through the perforations of the perforated metal sheets 2 flows over it.

The protective gas stream arrives dry through a circuit conduit 3 and is brought to the desired conditioning temperature by a heater 10 before entry into the conditioning vessel 1. After its entry through an inlet 4 into the conditioning vessel 1, it conducts water vapor away from the surface of the material, and leaves the conditioning vessel 1 charged with water vapor through an outlet 5. Through the circuit conduit 3 the protective gas stream charged with water vapor passes to a water separator 6, in which it is decompressed through a nozzle 8. Due to the cooling which thereby arises, the water condenses on the internal surfaces of the water separator 6; a water outlet spigot 7 serves to empty the water separator 6 at suitable points in time.

The thusly decompressed protective gas stream, freed from a large part of the water vapor which has been carried along, is drawn out of the water separator 6 by a pump 9 and compressed, whereby it is warmed. The pump 9 thereafter forces the protective gas stream into the portion of the circuit conduit 3 which leads to the conditioning vessel 1, so that the protective gas stream can be charged there with water vapor again.

EXAMPLES

In an upright, cylindrical conditioning vessel having a diameter of 1 m and a height of 1.5 m, which has a central gas inlet in its base, there is a perforated metal sheet unit with 5 perforated metal sheets arranged one above the other for receiving particulate material. After filling with product to be dried, the vessel is closed with a pressure tight cover and initially flushed with gas and then placed under pressure. From the cover a gas conduit leads to a nozzle which opens into a decompression chamber which permits separation of the mixture cooled by decompression into condensate, which is discharged, and gas. From there the gas conduit leads to a compressor, in which it is brought to the conditioning temperature. The dry gas now passes through the previously mentioned inlet in the base of the conditioning chamber back in the circuit, it flows through the product and thereby takes up its moisture.

In the described arrangement, 150 kg of finely diced, cooked pork can be dried in a 1:1 mixture of carbon dioxide and nitrogen at a pressure of 8 bar and a compressor capacity of 500 l/min, within 6 h at 70° C.

For especially gentle drying of 100 kg chopped fresh paprika pods in carbon dioxide at 50° C. and 4 bar approx. 24 hours are required.

The protective gas stream arrives dry through a circuit conduit 3 and is brought to the desired conditioning temperature by a heater 10 before entry into the conditioning vessel 1. After its entry through an inlet 4 into the conditioning vessel 1, it conducts water vapor away from the surface of the material, and leaves the conditioning vessel 1 charged with water vapor through an outlet 5. Through the circuit conduit 3 the protective gas stream charged with water vapor passes to a water separator 6, in which it is decompressed through a nozzle 8. Due to the cooling which thereby arises, the water condenses on the internal surfaces of the water separator 6; a water outlet spigot 7 serves to empty the water separator 6 at suitable points in time. The thusly decompressed protective gas stream, freed from a large part of the water vapor which has been carried along, is drawn out of the water separator 6 by a pump 9 and compressed, whereby it is warmed. The pump 9 thereafter forces the protective gas stream into the portion of the circuit conduit 3 which leads to the conditioning vessel 1, so that the protective gas stream can be charged there with water vapor again.

PROCESS EXAMPLES

1. In an upright cylindrical pressure container having a diameter of 0.5 m and a height of 3.0 m, 200 l/h of liquid pulp from fresh strawberries are continuously introduced through an inlet conduit spaced 0.5 m from an upper central outlet, whereby the container and its contents are maintained under pressure. From the container filled with the pulp up to the upper gas space, the pulp is withdrawn again at a lower outlet. Shortly above this point a mixture of 50% carbon dioxide and 50% nitrogen is introduced as a gas by means of an annular nozzle and transported upwardly in countercurrent relation through the flowing mass; it collects in the free space above the inlet conduit. Amount of gas 600 l/h at a system pressure of 6 bar and the gas and pulp temperature of 50° C.

From the upper gas space the (moisture)-laden gas mixture is withdrawn, decompressed to standard pressure, cooled with ice water and separated from the aqueous condensate. The gas mixture is compressed to 6 bar in a compressor, warmed to process temperature and conducted again to the dearomatizing process.

The aroma condensate is worked up, the pulp freed from volatile aroma materials is subsequently concentrated and spray dried after the addition of soluble starch.

2. In a horizontal tube with a gas-tight construction having a diameter of 1.3 m and a length of 4.0 m, there is an endless screen which has a contact surface 3 m in length and 1 m wide. This screen moves at a speed of 1 m/min. In as pure as possible of an atmosphere of carbon dioxide heated to 80° C. the coarsely milled arabica portion of a roast coffee mixture intended for extract is uniformly deposited on the beginning of the screen belt and during further transport is turned over several times by sheet metal guides and also heated under a chain of radiant heaters to 80° to 100° C. After exiting the coffee is abruptly cooled and deposited in the supply silos of an extraction installation.

3 m³/min of carbon dioxide gas heated to 80° C. are conveyed at a slight overpressure (1.05 bar) in countercurrent relation opposite the movement of the belt, drawn out of the system at the point of introduction of the coffee, cooled to 10° C., freed from mostly aqueous condensate and subsequently conducted upwardly through a packed column counter to downwardly moving coffee oil. Thereafter, the gas is indirectly warmed again and supplied to the circuit in the apparatus. The aroma components are worked up and mixed as a concentrate with the freeze dried extract.

3. In a cylindrical pressure container having a capacity of 2 m³ and a compact form there is a fixed screen unit immediately above the base. A tubular conduit having a diameter of about 20 cm, in which a gas circulation pump is built in, leads from the upper portion of the container to the region underneath the screen.

In the container above the screen a charge of 1,000 kg terylene granulate is deposited which due to its production process is contaminated with acetaldehyde. After evacuation and filling with carbon dioxide and warming of the gas to 70° C. and 12 bar with circulation, enough warm water is sprayed in the circulating gas that the water vapor saturation pressure is nearly achieved. The quantity of circulating gas now amounts to 20 m³/min.

In a side stream 200 l/min of hot moist gas are withdrawn from the system and cooled in a cooling system to a value of approaching 0° C. without changing the pressure, whereby the acetaldehyde is also separated with the water. The purified gas is recycled together with an amount of fresh water corresponding to the separated condensate in order to maintain a constant moisture (in) the circulating gas.

After approximately six hours the described operation is ended over (the course of) one hour initially by shutting off the supply of water and subsequent drying of the system by circulation of the pure gas. Now the gas is decompressed and the cleaned granulate withdrawn.

4. In an upright, cylindrical conditioning vessel having a diameter of 1 m and a height of 1.5 m, which has a central gas inlet in its base, there is a perforated metal sheet unit with 5 perforated metal sheets arranged one above the other for receiving particulate material. After filling with product to be dried, the vessel is closed with a pressure tight cover and initially flushed with gas and then placed under pressure. From the cover a gas conduit leads to a nozzle which opens into a decompression chamber which permits separation of the mixture cooled by decompression into condensate, which is discharged, and gas. From there the gas conduit leads to a compressor, in which it is brought to the conditioning temperature. The dry gas now passes through the previously mentioned inlet in the base of the conditioning chamber back in the circuit, it flows through the product and thereby takes up its moisture.

In the described arrangement, 150 kg of finely diced, cooked pork can be dried in a 1:1 mixture of carbon dioxide and nitrogen at a pressure of 8 bar and a compressor capacity of 500 l/min, within 6 h at 70° C.

For especially gentle drying of 100 kg chopped fresh paprika pods in carbon dioxide at 50° C. and 4 bar approx. 24 hours are required.

I claim:

1. A process for drying plant or animal material comprising contacting the material in a closed pressurized container with a gas stream which carries away the water to be separated at a temperature between 30° and 80° C. and an elevated pressure ranging from greater than 1 up to 30 bar for from 1 to 48 hours until the material is substantially dry, wherein said gas stream consists of carbon dioxide or a carbon dioxide nitrogen mixture in which the proportion of nitrogen is not greater than 50%.

2. Process according to claim 1, wherein the temperature lies between 30° and 50° C.

3. Process according to claim 1 wherein the temperature is varied during the separation of the water.

4. A process according to claim 1, wherein the pressure ranges up to 16 bar.

5. Process according to claim 1, wherein the gas is conducted through a condenser and/or adsorber.

6. Process according to claim 5, wherein the gas stream in the condenser and/or adsorber is cooled or decompressed.

7. Process according to claim 1, wherein the material is warmed during contacting with the gas.

8. A process according to claim 1, wherein said gas is conducted in a circuit.

9. A process according to claim 4, wherein said pressure lies in the range from 2 to 10 bar.

10. A process according to claim 9, wherein said pressure lies in the range from 2 to 6 bar.

11. A process according to claim 1, wherein the gas is conducted through an adsorber.

12. A process according to claim 11, wherein the gas stream in said adsorber is cooled or decompressed.

13. A process according to claim 8, wherein the material is traversed by the gas for from 4 to 24 hours.

* * * * *